(12) United States Patent
Roby

(10) Patent No.: US 6,874,998 B2
(45) Date of Patent: Apr. 5, 2005

(54) TURBOCHARGER WITH REDUCED COKING

(75) Inventor: Steve Roby, Ashville, NC (US)

(73) Assignee: BorgWagner Inc., Auburn Hills, MI (US)

( * ) Notice: Subject to any disclaimer, the term of this patent is extended or adjusted under 35 U.S.C. 154(b) by 0 days.

(21) Appl. No.: 10/407,359

(22) Filed: Apr. 4, 2003

(65) Prior Publication Data

US 2004/0197212 A1 Oct. 7, 2004

(51) Int. Cl.⁷ .............................................. F04B 17/00
(52) U.S. Cl. .................... 417/407; 60/602; 415/111; 415/112; 428/315.9
(58) Field of Search ....................... 417/407; 60/602; 415/111–112, 175, 177–178; 508/107; 428/315.9, 694 TF; 524/225; 184/6.11, 6.16, 6.26, 55.1

(56) References Cited

U.S. PATENT DOCUMENTS

| | | | |
|---|---|---|---|
| 3,845,619 A | * 11/1974 | O'Neill | 60/39.512 |
| 4,364,717 A | * 12/1982 | Schippers et al. | 417/407 |
| 4,776,167 A | * 10/1988 | Kawamura | 60/602 |
| 5,998,521 A | * 12/1999 | Fan et al. | 524/225 |
| 6,261,678 B1 | * 7/2001 | von Fragstein et al. | 428/315.9 |
| 2002/0047326 A1 | * 4/2002 | Higuchi | 310/42 |
| 2002/0173431 A1 | * 11/2002 | Hirata | 508/107 |

FOREIGN PATENT DOCUMENTS

DE 3235538 A1 * 3/1984 .................. 417/407

* cited by examiner

Primary Examiner—Thai-Ba Trieu
(74) Attorney, Agent, or Firm—Pendorf & Cutliff; Greg Dziegielewski

(57) ABSTRACT

A turbocharger including means for preventing or reducing coking, particularly following engine shutdown, without noticeably increasing weight or volume of the turbocharger. The turbocharger bearing housing (14) has defined therein a lubrication flow path for bearing lubricant and a lubricant drain gallery (40) below a shaft (20), and in accordance with the invention at least a portion of a wall (42) of the lubricant drain gallery (40) is coated with an oil repellant and/or heat insulating coating (44).

16 Claims, 1 Drawing Sheet

TURBOCHARGER WITH REDUCED COKING

FIELD OF THE INVENTION

The present invention concerns a turbocharger including means for preventing or reducing coking, particularly following engine shutdown, without noticeably increasing weight or volume of the turbocharger.

DESCRIPTION OF THE RELATED ART

Turbochargers generally include a turbine housing section for directing exhaust gasses from an exhaust inlet to an exhaust outlet across a turbine rotor. The turbine rotor drives a shaft journaled in a bearing housing section. A compressor rotor is driven on the other end of the shaft.

Crankcase oil is commonly used to lubricate the rotating bearing interfaces as well as the thrust surfaces that limit axial excursions of the shaft. Temperatures of about 740° C. occur in the exhaust gas turbine in the case of Diesel engines and above about 1,000° C. in the case of Otto-cycle engines. Heat migrating from the turbine housing section and turbine into the shaft and bearing housing raise the temperature high enough to degrade or "coke" the remaining oil in the bearing housing after engine shutdown, and especially following a high load operation, evidenced by the buildup of carbonaceous deposits in the housing. This coked oil may form plugs in the bearing housing, preventing drainage and causing pooling of oil and at the same time preventing heat removal, leading to turbocharger failure.

One interim and incomplete solution to the above problem was provided by the inclusion of a hydraulic accumulator with a check and metering valve in the oil supply conduit between the engine and turbocharger. During engine operation this accumulator filled with pressurized oil. Upon engine shutdown the oil was allowed to flow to the turbocharger at a controlled rate to provide bearing and shaft cooling while the remainder of the turbocharger cooled down. However, automotive passenger vehicles do not allow sufficient space for an accumulator which is of sufficient size to dissipate the residual heat of passenger car turbochargers.

Further, turbocharged passenger cars are required to meet increasingly stringent emissions standards. With high lubricant flow rate comes the possibility that some amount of the oil will escape past the barriers set up in the turbocharger to prevent lubricating oil from entering either the turbine housing or the compressor housing. This lubricating oil is ultimately emitted via the exhaust, contributing to emissions. In order to cut down on hydrocarbon emissions, turbocharger assemblies have recently been designed allowing lubrication and support of the bearings with a reduced amount of oil flow through the bearing housing, resulting in significantly lower oil passage from the turbocharger into the engine or engine exhaust. However, as the flow rate of the oil is reduced, heat removal is reduced, bearing housing temperatures increase, and the coking tendency is increased, requiring countermeasures.

Vehicle operators are instructed to continue to idle an engine for several minutes following high load operation prior to shutdown in order to cool the turbocharger. However, in practice such procedures are frequently not followed.

An engineering approach to preventing coking of an exhaust gas driven turbocharger involves cooling the center housing by communicating engine coolant through a water jacket cast into the wall of the turbocharger center housing. However, these complicated cooling systems further increase the already large weight of turbochargers. Further, water cooled center housings are typically manufactured from cast iron in which sand cores are used to form the water jacket. The water jackets in these turbochargers are difficult to cast, are subject to leaking due to casting porosity, and it is quite difficult to clean the core sand out of the water jacket during manufacture.

U.S. Pat. No. 5,549,449 (McInerney et al) entitled "Turbomachinery Incorporating Heat Transfer Reduction Features" and U.S. Pat. No. 5,403,150 (McEachern, Jr. et al) entitled "Bearing Insulating System for Aircraft Turbocharger" disclose heavily modified turbocharger structures. These modifications increase weight and manufacturing cost.

U.S. Pat. No. 4,784,586 (Ho) entitled "Turbocharger Having Controlled Heat Transfer for Bearing Protection" teaches a turbocharger with a center housing portion configured to reduce heat transfer from a turbine housing portion to a turbine-end bearing in order to reduce oil coking in the latter. A phase-change material is included in the center housing portion more specifically, a mass of material is disposed within the cavity and selected to undergo a molecular change of phase with attendant absorption of heat at a selected temperature. Control of lubricant flow further aids in reduction of oil coking in the turbocharger, primarily following engine shut down. However, this approach adds both weight and substantial manufacturing cost to the turbocharger. There is a need for a low-weight and low cost solution to the problem of coking.

U.S. Pat. No. 4,735,556 (Fujikaki et al) teaches a turbocharger with a thermo-isolating means, such as an annular member made of a low heat conductive material, between the turbine housing and the bearing housing in order to reduce the heat transferred from the turbine housing to the bearing housing. The annular member contacts with the wall of the turbine housing, so that the heat transferred from the turbine housing to the connecting portion is reduced. Thermo-reducing means also comprises a sensible heat reducing means which is composed of a layer made of a low conductive material on the inner surface of the wall of the turbine housing, reducing heat transfer from the exhaust gas to the turbine housing wall, thus suppressing temperature rise in the turbine housing and therefore reducing heat transfer from the turbine housing to a bearing housing, leading to suppression of the temperature rise of the bearing housing. Further, a layer made of a high emissive material is provided on the outer surface of the wall of the turbine housing for effectively radiating out the heat. Further yet, a covering layer made of a low heat conductive material is provided on the surface of a turbine housing of a turbocharger which is in contact with exhaust gas. The covering layer is preferably made of a low heat conductive material and more preferably made of a material with a low emissivity as well as a low heat conductivity. While these structural elements block many routes of heat transfer, they do not adequately block heat transfer to the lubricant drainage gallery.

U.S. Pat. No. 5,026,260 (Gutknecht et al) entitled "Turbocharger with Turbine Backplate and Center Housing Oil Shield" teaches incorporation of additional elements and design features for increasing thermal insulation between turbine and center housing in order to reduce coking.

Despite these extensive measures, coking remains a problem, particularly in low lubricant flow turbochargers.

More specifically, heat from the exhaust gas tends to be conducted along the turbine rotor. As lubricating oil passes through the narrow gap between the turbine rotor and the bearings it is heated to an elevated temperature. As the lubricating oil subsequently contacts the sidewalls of the bearing housing which is heated by the turbine housing, coking is likely to occur.

Accordingly, there is a need for a simple, low cost and effective means to prevent coking in the bearing housing of a turbocharger.

SUMMARY OF THE INVENTION

The present invention is made in part based upon recognition that the problem of coking is most likely to occur in the area of the bearing housing nearest to the turbine housing, and particularly in the lubricant drain gallery below the bearings. The inventor suspected that, following engine shut-down, oil which had been heated upon passing through the gaps between shaft and bearings and between bearings and bearing housing, and thereafter contacts the turbine-heated side wall of the bearing housing, is most liable to being heated to the point of coking.

In order to address this problem, the inventor considered that it might be beneficial if (a) the rate of heat transfer from the turbine housing to the bearing housing could be reduced, and (b) the drainage of oil from the walls of the bearing housing following engine shut-down, and particularly in the lubricant drain gallery, could be accelerated. However, given the limited amount of engine compartment space available for installation of mechanical means, and given the requirement for low weight and high efficiency, such a solution did not seem to be achievable.

Following experimentation the inventor discovered that coking can in fact be greatly reduced without noticeably increasing weight or volume of the turbocharger by coating at least a part of the wall of the internal space through which lubricant flows with an oil repelling and/or heat insulating coating.

It is the intent of the present invention to promote oil drainage from the turbocharger lubricant drain gallery. This requires counteracting oil drag due to friction modifiers added to commercial oils to actually make the oil cling to metal surfaces. In the present invention at least a part of the drain gallery is made substantially resistance or friction free with the application of, e.g., a thin film of oil repellant coating such as, for example, poly-tetra-fluoro-ethylene (i.e., Teflon), or similar fluorocarbon coating, which eliminates any oil drag. Perfluoropolyether-containing compounds have good oil repellency. Examples of such coatings are disclosed, e.g., in U.S. Pat. No. 6,528,672. The coating preferably has self-leveling properties, such as a self-leveling polyurethane coating. With such coatings the micro-imperfections of the inner wall of the bearing housing of the turbocharger are made smooth, the effective surface area (wetable surface area) of a wall is reduced, and oil drainage is promoted. Although oil drainage is promoted by the physical properties of the coating independent of the chemical properties of the coating, in the context of the present invention any self-leveling coating which promotes drainage will also be considered to be within the meaning of "oil repellant coating". An organosilicon oil repellant coating for a combustion chamber component for an internal combustion engine is disclosed in U.S. Pat. No. 6,257,217. Alternative oil-resistant coatings for metal can be prepared by applying a solution comprising an amide thiol compound, preferably a fluoralkyl amide thiol, and a solvent to a metal surface, allowing the thiol compound to self assemble on the surface, and removing excess thiol compound from the surface, as disclosed in U.S. Pat. No. 6,183,815.

More specifically, the turbocharger preferably comprises:

a bearing housing journaling an elongate shaft therein, a turbine wheel drivingly carried at one end of said shaft, and a compressor wheel drivingly carried at the opposite end of said shaft, said bearing housing defining an exhaust gas inlet to said turbine wheel and an exhaust gas outlet therefrom, said housing further defining an air inlet to said compressor wheel and an air outlet therefrom, said housing further defining a lubrication flow path for lubricant for said bearing and a lubricant drain gallery below said shaft, wherein at least a portion of the lubricant drain gallery is coated with a coating which is preferably both oil repelling and heat insulating.

The heat insulating coating may be a heat resistant ceramic coating. Alternatively, the heat insulating coating may be an automobile engine enamel paint as conventional in the automobile industry and as disclosed for example in U.S. Pat. No. 5,223,104, the disclosure of which is incorporated herein by reference. Further yet, the heat insulating and oil-drainage facilitating coating may be a fluoropolymer non-stick coating as commonly employed in the baking utensil art, comprising for example (a) an undercoat comprising inorganic filler of ceramic particles, at least one adhesion promoter and a fluoropolymer, and (b) a fluoropolymer overcoat.

The invention may also be embodied in a turbocharger apparatus comprising a bearing housing means for spacing apart respective compressor housing and turbine housing portions and journaling an elongate shaft extending between said housing portions, a compressor rotor and a turbine rotor each drivingly connected to said shaft at opposite ends thereof and rotatable within respective ones of said housing portions, bearing means carried by said bearing housing means proximate to said turbine housing portion and rotatably supporting said shaft, said shaft defining a first conductive heat transfer path extending from said turbine rotor to said bearing, lubrication means causing lubricant to flow over said bearing and to a lubricant drain gallery, wherein a second conductive heat transfer path extends from said turbine housing to said bearing housing and from said bearing housing to said lubricant drain gallery, wherein at least a part of said lubricant drain gallery is coated with a heat insulating material.

The foregoing has outlined rather broadly the more pertinent and important features of the present invention in order that the detailed description of the invention that follows may be better understood, and so that the present contribution to the art can be more fully appreciated. Additional features of the invention will be described hereinafter, which form the subject of the claims of the invention. It should be appreciated by those skilled in the art that the conception and the specific embodiments disclosed may be readily utilized as a basis for modifying or designing other compressor wheels for carrying out the same purposes of the present invention. It should also be realized by those skilled in the art that such equivalent structures do not depart from the spirit and scope of the invention as set forth in the appended claims.

BRIEF DESCRIPTION OF THE DRAWINGS

For a fuller understanding of the nature and objects of the present invention reference should be made by the following detailed description taken in with the accompanying drawings in which.

DETAILED DESCRIPTION OF THE INVENTION

Figure 1:
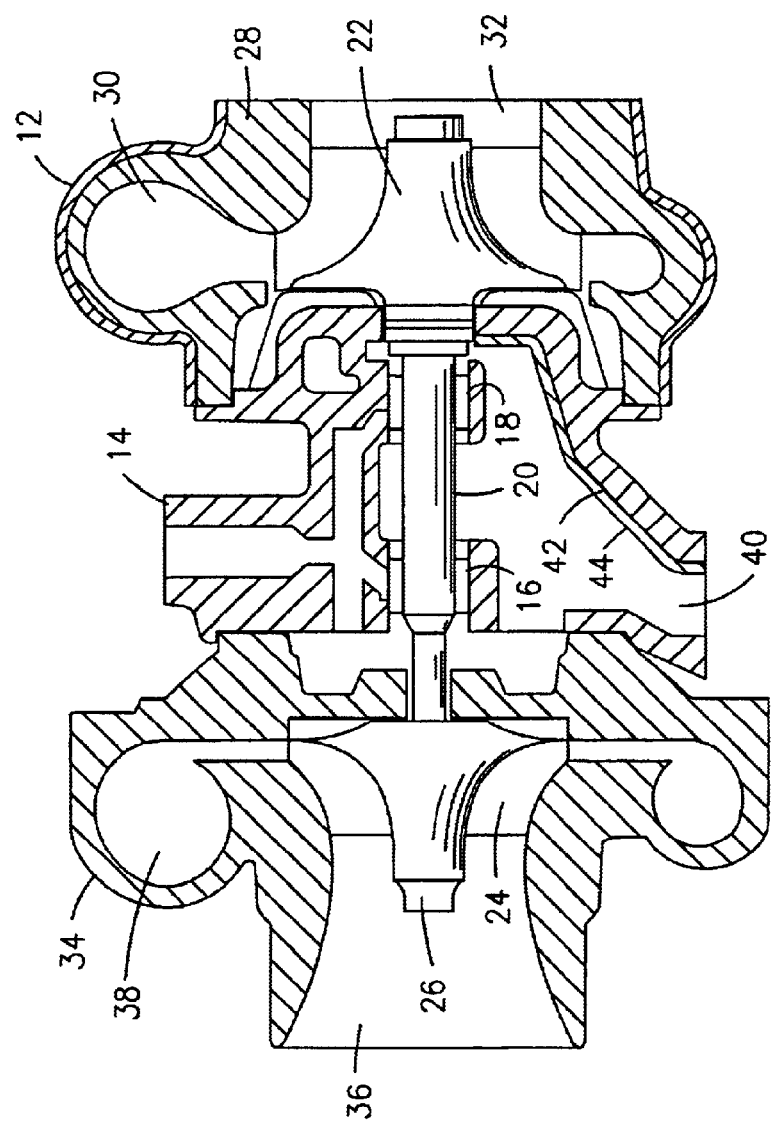
FIG. 1 shows a turbocharger with a partially coated lubricant drain gallery.

The present invention is applicable to any exhaust gas driven turbocharger, and particularly those lubricated by a lubricant liable to coking. Turbochargers being well known in the art, there is no need herein to go into detail on any specific design of any one turbocharger. The embodiment shown in FIG. 1 shall be considered representative herein of turbochargers in general.

With reference to FIG. 1, a turbocharger 10 includes a housing generally referenced with the numeral 12. Housing 12 includes a center section 14 receiving a pair of spaced apart journal bearings 16, 18, and rotatably receiving therein an elongate shaft 20. A turbine wheel 22 is attached to or integrally formed with one end of shaft 20. At the opposite end of shaft 20 a compressor wheel 24 is carried thereon and drivingly secured thereto by a nut 26 threadably engaging the shaft.

A turbine housing section 28 mates with the bearing housing section 14 and defines an exhaust gas inlet 30 leading to a radially outer portion of the turbine wheel 22. The turbine housing section also defines an exhaust gas outlet 32 leading from the turbine wheel 22. Similarly, a compressor housing section 34 mates with the bearing housing section 14 at the end thereof opposite the turbine housing section 28. The compressor housing section 34 defines an air inlet 36 leading to the compressor wheel 24, and an air outlet (not shown) opening from a diffuser chamber 38.

Upon shutdown of the engine supplying exhaust gasses to inlet 30, both the source of heat energy and the source of cooling oil flow to the turbocharger cease to operate. However, both the turbine housing section 28 and turbine wheel 22 are hot and hold a considerable quantity of residual heat. This residual heat is conducted to the cooler parts of the turbocharger much as heat was conducted during operation thereof. However, no cooling oil flow or internal compressor air flow is now present. Consequently, the temperature of shaft 20 and bearing housing 14 progressively increase for a time over their normal operating temperatures. This temperature increase, if uncontrolled, could result in temperatures at bearings 16, 18, and center housing lubricant drainage gallery 40 and particularly at the latter, which would degrade or coke the residual oil therein.

With the closer attention now to the heat transfer to bearing 18 by conduction within turbocharger 10, clearly the shaft 20 provides a conductive path directly to bearing 18. However, experience has shown that the relatively low mass and low heat storage capacity of the turbine wheel are a minor factors in the problem of coking. It is heat conduction via the material of the bearing housing of conventional turbochargers which is the most significant factor in causing oil coking.

Consequently, in accordance with the present invention, oil coking in the bearing housing is avoided by coating the inner wall of the bearing housing, namely, the wall 42 of the lubricant drain gallery nearest the turbine housing 28, to retard heat transfer and preferably also to accelerate oil drainage from the lubricant drain gallery wall.

In addition to the above, it will be seen that the bearing carrier portion defines a recess to receive oil flung radially outward by spinning motion of shaft. In order to drain oil from this recess, the bearing carrier portion defines a conduit opening downwardly therefrom into oil drain gallery. Recognizing that the bearing housing wall is exposed on its surface contacting the turbine housing to heat from exhaust gases conducted through a very short heat transfer path, it is desirable to coat this area also with the thermal insulating and oil repellant coating, in order to minimize thermal breakdown or coking of the oil on such surfaces.

An advantage of the present invention, besides the elimination of engine coolant plumbing to the turbocharger and attendant simplified installation and maintenance, is its particular utility with air-cooled engines. These engines have no liquid engine coolant which could be used in the conventional way to cool a turbocharger. Consequently, turbocharger applications to these engines have conventionally involved many problems. The present invention is believed to provide a substantially complete solution to this difficult turbocharger application problem.

The heat insulating coating may be a heat resistant ceramic coating, or may be an automobile engine enamel paint as conventional in the automobile industry, or may be a fluoropolymer non-stick coating as commonly employed for example in the baking utensil art, comprising for example (a) an undercoat comprising inorganic filler of ceramic particles, at least one adhesion promoter and a fluoropolymer, and (b) a fluoropolymer overcoat. The physical properties of the coating are important, not the chemical composition of the coating, thus it is readily apparent that other coating compositions may be readily selected by those skilled in the art satisfying the above requirements.

With regard to the ceramic coatings, examples of compositions and coating techniques can be found for example in U.S. Pat. No. 4,074,010 (Knight) entitled "Ceramic-Paint Coatings" and references cited therein. For example, the fresh bearing housing casting may be cleaned, openings of lubricant channels which are not to be coated may be plugged with plastic plugs and the thus protected bearing housing may be dipping the in a ceramic or porcelain slip, followed by drying and firing. Alternatively, the bearing housing may be placed on its side, and openings may be plugged with plastic plugs to form a "bowl" shape. The sideways bearing housing may then be filled halfway with a ceramic or porcelain slip, then rotated to allow the slip to drain, leaving a coating on the turbine-side of the interior of the bearing housing, and particularly in the lubricant drain gallery.

A spray coating of ceramic having high insulating value and suitable for coating of an exhaust manifold is disclosed in U.S. Pat. No. 6,041,595. While such a ceramic or porcelain slip is not inherently oil resistant or repellant, the oil repellency and drainage rate can be improved by including a glass frit in the slip or glazing to form a glass sheen following firing. Alternatively, an oil repellant coating such as a fluoropolymer may be subsequently coated over the ceramic layer.

Turning next to automobile engine enamel paint type coatings, it is well within the skill of those working in the art to select suitable paints from among those conventionally employed in the automobile industry and as disclosed for example in U.S. Pat. No. 5,223,104, the disclosure of which is incorporated herein by reference. Any conventional technique for application of paint may be used.

Yet another suitable coating material is a coating comprising tungsten disulfide, alumina, silica, or an alumina-silica sol gel as conventionally employed for inhibiting coke formation in fuel-contacting areas of gas turbine engines, as disclosed for example in U.S. Pat. Nos. 5,266,360 and 5,324,544.

Yet another suitable coating exhibiting high thermal insulation and heat stability is an aluminum-alumina cermet.

Turning finally to fluropolymer coatings such as PTFE or Teflon coatings, these coatings are well known in, for example, the cooking utensil art, disclosure of which can be found for example in U.S. Pat. Nos. 3,393,086; 6,123,999; 5,562,991; and 6,403,213.

Using the coating disclosed in U.S. Pat. No. 6,403,213 as an example, this reference teaches a coating system comprising (a) optionally a base coat applied directly to the substrate beneath the primer, (b) a multilayer non-stick coating of a primer, and (c) a top coat with one or more intermediate layers. The base coat and primer are referred to as undercoats. The intermediate coating(s) and topcoat are referred to as overcoats.

The major component of the undercoat composition is an inorganic filler of ceramic particles. The inorganic filler together with a minor amount of adhesion promoter surprisingly produces a smooth, continuous film with superior adhesion to a variety of substrates as well as to fluoropolymer applied as an overcoat to the undercoat. The high level of inorganic filler present reduces the level of shrinkage that occurs during normal drying and coating operations. By reducing the levels of stress in a coating, adhesion of the coating to a substrate is increased. This reduction results because the levels of stress that contribute to shrinkage are in direct opposition to the force needed to secure the coating layer to the substrate. By increasing the amount of inorganic filler that contributes no or very little shrinkage, the coating comprised of inorganic and organic components undergoes decreased dimensional change upon heat application. The inorganic filler is composed of ceramic particles, the particles having an average particle size of 1 micrometer or less and the weight proportion of inorganic filler to adhesion promoter is in the range of 5:1 to 1.7:1. Additionally, the high level of inorganic filler contributes to increased scratch, wear and abrasion resistance.

An adhesion promoter component of the undercoat composition is preferably composed of organic polymer that is film-forming upon heating to fusion and is also thermally stable. This component is well known in undercoat applications for non-stick finishes, for adhering a fluoropolymer-containing undercoat layer to substrates and for film-forming within and as part of a undercoat layer. The fluoropolymer by itself has little to no adhesion to a smooth substrate. The adhesion promoter is generally non-fluorine containing and yet adheres to the fluoropolymer. The adhesion promoter is used as minor component in conjunction with a major amount of inorganic filler and optionally some fluoropolymer. An example of the adhesion promoter component is polyamic acid salt which converts to polyamide-imide (PAI) upon baking of the composition to form the undercoat layer.

The fluoropolymer component can also be melt-fabricable fluoropolymer, either combined (blended) with the PTFE, or in place thereof. Examples of such melt-fabricable fluoropolymers include copolymers of TFE and at least one fluorinated copolymerizable monomer (comonomer) present in the polymer in sufficient amount to reduce the melting point of the copolymer substantially below that of TFE homopolymer, polytetrafluoroethylene (PTFE), e.g., to a melting temperature no greater than 315° C. Preferred comonomers with TFE include the perfluorinated monomers such as perfluoroolefins having 3–6 carbon atoms and perfluoro(alkyl vinyl ethers) (PAVE) wherein the alkyl group contains 1–5 carbon atoms, especially 1–3 carbon atoms. Especially preferred comonomers include hexafluoropropylene (HFP), perfluoro(ethyl vinyl ether) (PEVE), perfluoro (propyl vinyl ether) (PPVE) and perfluoro(methyl vinyl ether) (PMVE). Preferred TFE copolymers include FEP (TFE/HFP copolymer), PFA (TFE/PAVE copolymer), TFE/HFP/PAVE wherein PAVE is PEVE and/or PPVE and MFA (TFE/PMVE/PAVE wherein the alkyl group of PAVE has at least two carbon atoms). The fluoropolymer component is generally commercially available as a dispersion of the polymer in water, which is the preferred form for the composition of the invention for ease of application and environmental acceptability.

Although this invention has been described in its preferred form with a certain degree of particularity with respect to turbocharger, it is understood that the present disclosure of the preferred form has been made only by way of example and that numerous changes in the details of structures and the composition of the combination may be resorted to without departing from the spirit and scope of the invention.

Now that the invention has been described,

I claim:

1. A turbocharger comprising:
    a bearing housing (14) journaling an elongate shaft (20) therein,
    a turbine wheel (22) carried at one end of said shaft (20),
    a compressor wheel (24) carried at the opposite end of said shaft (20),
    a turbine housing (28) defining an exhaust gas inlet (30) to said turbine wheel (22) and an exhaust gas outlet (32) therefrom,
    a compressor housing (34) defining an air inlet (36) to said compressor wheel (24) and an air outlet (38) therefrom, and
    said bearing housing further defining a lubrication flow path for lubricant and a lubricant drain gallery (40) below said shaft,
    wherein at least a portion of the lubricant drain gallery (40) is coated with an oil repelling coating (44).

2. The turbocharger as in claim 1, wherein said coating (44) is also heat insulating.

3. The turbocharger as in claim 1, wherein said coating (44) is a fluorocarbon coating.

4. The turbocharger as in claim 3, wherein said fluorocarbon coating is a poly-tetra-fluoro-ethylene coating.

5. The turbocharger as in claim 1, wherein said coating (44) is a coating containing perfluoropolyether compounds.

6. The turbocharger as in claim 1, wherein said coating (44) is a coating comprising amide thiol compounds.

7. The turbocharger as in claim 6, wherein said thiol compound is fluoralkyl amide thiol.

8. The turbocharger as in claim 1, wherein said coating (44) is an organosilicon coating.

9. A turbocharger comprising:
    a bearing housing (14) journaling an elongate shaft (20) therein, a turbine wheel (22) carried at one end of said shaft (20), a compressor wheel (24) drivingly carried at the opposite end of said shaft (20), a turbine housing (28) defining an exhaust gas inlet (30) to said turbine wheel (22) and an exhaust gas outlet (32) therefrom, a compressor housing (34) defining an air inlet (36) to said compressor wheel (24) and an air outlet (38) therefrom, and said bearing housing further defining a lubrication flow path for lubricant and a lubricant drain gallery (40) below said shaft, wherein at least a portion of the lubricant drain gallery (40) is coated with a heat insulating and oil repelling coating (44).

10. The turbocharger as in claim 9, wherein said coating (44) is a fluorocarbon coating.

11. The turbocharger as in claim 10, wherein said fluorocarbon coating is a poly-tetra-fluoro-ethylene coating.

12. The turbocharger as in claim 9, wherein said coating (44) is a coating containing perfluoropolyether compounds.

13. The turbocharger as in claim 9, wherein said coating (44) is a coating comprising amide thiol compounds.

14. The turbocharger as in claim 13, wherein said thiol compound is fluoralkyl amide thiol.

15. The turbocharger as in claim 9, wherein said coating (44) is an organosilicon coating.

16. A turbocharger comprising:

a bearing housing means (14) for spacing apart respective compressor housing (34) and turbine housing (28) portions and journaling an elongate shaft (20) extending between said housing portions (34, 28), a compressor rotor (24) and a turbine rotor (22) each connected to said shaft (20) at opposite ends thereof and rotatable within respective ones of said housing portions, bearing means (18) carried by said bearing-housing means proximate to said turbine housing (28) portion and rotatably supporting said shaft (20), said shaft defining a first conductive heat transfer path extending from said turbine rotor to said bearing, and lubrication means causing lubricant to flow over said bearing (18) and to a lubricant drain gallery (40), wherein a second conductive heat transfer path extends from said turbine housing (28) to said bearing housing (14) and from said bearing housing (14) to said lubricant drain gallery (40), and wherein at least a part of said lubricant drain gallery (40) is coated with an oil repellant and heat insulating coating (44).

* * * * *

UNITED STATES PATENT AND TRADEMARK OFFICE
CERTIFICATE OF CORRECTION

PATENT NO.   : 6,874,998 B2
DATED        : April 5, 2005
INVENTOR(S)  : Steve Roby It is certified that error appears in the above-identified patent and that said Letters Patent is hereby corrected as shown below:

<u>Title page,</u>
Item [73], Assignee, should read -- Borgwarner Inc., Auburn Hills, MI (US) --

Signed and Sealed this

Twenty-eighth Day of June, 2005

JON W. DUDAS
*Director of the United States Patent and Trademark Office*